United States Patent [19]

Biller et al.

[11] 4,140,044
[45] Feb. 20, 1979

[54] LONG STROKE, LARGE BORE, LOW FRICTION HYDRAULIC ACTUATORS

[75] Inventors: Joseph Biller, Kirkwood, N.Y.; Willard D. Kaiser, Grove City, Ohio

[73] Assignee: The Singer Company, Binghamton, N.Y.

[21] Appl. No.: 710,767

[22] Filed: Jul. 30, 1976

[51] Int. Cl.² .......................................... F01B 31/00
[52] U.S. Cl. ...................... 92/5 R; 91/402; 91/408; 92/86.5; 92/165 R; 308/4 R
[58] Field of Search ............ 92/167, 153, 159, 165 R, 92/5 R, 5 L, 168, 162, 154, 158, 86.5; 91/402, 407, 409, 408; 308/4 R

[56] References Cited

U.S. PATENT DOCUMENTS

| | | | |
|---|---|---|---|
| 1,548,773 | 8/1925 | Ziebarth | 92/168 |
| 3,015,315 | 1/1962 | Strimel | 92/162 R |
| 3,138,066 | 6/1964 | Walker | 91/408 |
| 3,153,987 | 10/1964 | Thoma | 92/57 |
| 3,168,013 | 2/1965 | Williamson | 92/162 R |
| 3,311,030 | 3/1967 | Halstead | 92/167 |
| 3,742,822 | 7/1973 | Talbert | 92/168 |
| 3,776,558 | 12/1973 | Maurer | 92/165.R |
| 3,824,904 | 7/1974 | Visser | 92/168 |
| 3,847,404 | 11/1974 | Agostino, Jr. | 92/165.R |
| 3,865,015 | 2/1975 | Hakansson | 92/165.R |
| 3,889,934 | 6/1975 | Kamman | 92/165 R |
| 3,898,555 | 8/1975 | Tellerman | 92/168 |
| 3,940,151 | 2/1976 | Phillips | 92/165.R |
| 3,977,308 | 8/1976 | Swander, Jr. | 92/167 |

FOREIGN PATENT DOCUMENTS

| | | | |
|---|---|---|---|
| 1260803 | 1/1972 | United Kingdom. | |
| 2313215 | 6/1974 | Fed. Rep. of Germany | 92/5 R |

*Primary Examiner*—Martin P. Schwadron
*Assistant Examiner*—Abraham Hershkovitz
*Attorney, Agent, or Firm*—James F. Duffy; Jeffrey Rothenberg

[57] ABSTRACT

A large bore, long stroke, low friction, hydraulic actuator having dual hydrostatic bearings permitting elastic deformation of the piston rod while inhibiting metal to metal contact between either the piston head or the deformed piston rod and the walls of the hydraulic cylinder. The actuator employs a safe and highly reliable metering orifice cushion decelerating means. Piston displacement is constantly monitored by a completely internal, magnetostrictive, sonic delay line displacement measuring means.

12 Claims, 7 Drawing Figures

LONG STROKE, LARGE BORE, LOW FRICTION HYDRAULIC ACTUATORS

BACKGROUND OF THE INVENTION

1. Field of the Invention

The invention relates to hydraulic cylinder devices. In particular, the invention concerns long stroke, large bore, low friction hydraulic actuators. (Herein, "Friction" refers to "turn-around friction".)

Hydraulic actuators having cylinder bores approaching two inches, and piston strokes of twelve inches are fairly standard devices. (Piston stroke may be defined as the maximum excursion of the piston rod from the cylinder). In motion system simulators using hydraulic actuators, it is not uncommon to find hydraulic cylinders having bores in excess of two inches and stroke lengths as great as sixty inches or more. In general it may be said that cylinders having bores in excess of two inches and stroke lengths of eighteen inches or greater may be defined as large bore, long stroke hydraulic actuators.

2. Prior Art

In prior art actuators, friction levels encountered in operation of good devices have typically been on the order of three hundred pounds and in many instances as high as six to twelve hundred pounds.

With long stroke actuators, and especially where rapid extension and retraction of the piston is required, it becomes necessary to provide some form of safety device to prevent catastrophic failures of the system resulting from an uncontrolled deceleration after such extension or retraction.

Various techniques have been used to control the deceleration of the cylinder piston. External controls are often used to control the hydraulic fluid flow. Check valves and flow control valves may be employed in meter type circuitry. An advantage of the external controls is that deceleration can be regulated over a longer portion of the cylinder stroke. There is a disadvantage however in that the entire system is more expensive, because more components are required, and also because it is less reliable for having those additional components. It has also been found in practice that flow control valves often cause very unpredictable and unstable performance; whereas, check valves in the system may cause extensive pressure pulses when they change state.

Deceleration may be controlled with internal cushioning. Cushioning can be provided, and usually is, at both ends of the cylinder. Cushioning at one end slows the piston as it approaches full retraction and at the other end it slows the piston as it nears full extension. The typical internal cushion comprises a spear and cavity arrangement. When the piston moves, hydraulic fluid is forced out in front of its motion and exits through the cavity. As the piston approaches the end of its travel, the spear enters and begins to block part of the cavity opening. The blocking effect continues as the spear penetrates further into the cushion cavity. As the blockage increases, less fluid flows from in front of the piston into and through the cavity. This exerts a cushioning force on the piston, gradually slowing it, and stopping it when the spear completely fills the cavity.

While such spear and cavity cushions can be quite effective when initially put into operation, wear and scoring is caused by interference between the walls of the cavity and the spear. Thus, effective deceleration degrades over the useful lifetime of the actuator as the gradual wearing decreases the effective blockage, especially when using low viscosity fluid.

In many instances it is desired to know the displacement of the piston from some "home" position. To this end, various external metering devices have been attached to the cylinder and the piston rod to measure the displacement of the piston. These devices are often subject to damage, leading to inaccuracies, as they are subject to wear and to damage in their operational environment.

The invention has as its objective the production of a large bore, long stroke, low friction hydraulic actuator having friction levels of one hundred pounds or less and utilizing internal deceleration cushioning which is not subject to wear and degradation during operation.

It is a further object of the invention to provide an internal metering device for determining the displacement of the piston from said known reference position. Further objectives and advantages of the invention will be readily determined from the disclosure which follows.

SUMMARY OF THE INVENTION

Method and apparatus for the production of a long stroke, large bore, low friction hydraulic cylinder are disclosed. Use of a dual hydrostatic bearing about the piston rod at the head end of the cylinder results in essentially eliminating reactive friction forces at the piston. The piston thus never carries any significant friction load brought about from contact with the walls of the cylinder. Use of dual hydrostatic bearings has the unique result that, for any given diametral clearance, the effective seal length may be increased by a factor of three, which, in turn, decreases leakage rates by the same factor. In addition, for any given allowable leakage rate, maximum diametral clearance may be increased by almost fifty percent. Narrow, low friction, piston rings permit the use of large piston-to-cylinder clearance, thus avoiding interference fits resulting from manufacturing tolerance build-up, without objectionably increasing oil leakage flow or friction levels. It may be noted here that the friction caused by these piston rings is independent of the number of ring elements used. Since each piston ring will produce a pressure drop, fluid leakage can be minimized, without excessively increasing friction, by using several sealing rings. Piccolo hole cushioning devices are utilized as a safety feature to prevent injury to personnel and equipment should the hydraulic system fail and produce catastrophic deceleration as the piston reaches one or the other ends of its excursion. A technique for the incorporation of a permanent magnet and a magnetostrictive element within the hydraulic cylinder itself is disclosed so that positional information as to the location of the piston along its stroke path may be accurately known at all times.

DESCRIPTION OF THE INVENTION

In servo-controlled hydraulic actuator systems it is desirable to obtain minimum friction in order to optimize performance. This is especially true in those servo-control systems which are used with motion systems in simulator devices to train operators of various land, sea and air vehicles. High friction levels in hydraulic cylinders used with simulator devices often lead to improper motion cues being provided to the operator which he then erroneously attempts to offset. In hydraulic systems incorporating non-vertical, single-ended hydraulic cylinders with short stop tubes, as are typical of most simulator motion systems, the weight of the cylinder itself can cause high bearing forces to be developed between the piston rod and the rod bearing, and between the piston and the sidewall of the cylinder. These high bearing forces can be the source of significant actuator friction forces.

Piston rod end-seals are often themselves another source of significant friction force. These friction forces become even more significant when the reactive forces noted above (that is, those forces resulting when the piston rod is fully extended, the cylinder horizontal, and rod and cylinder are supported at their extreme ends), are accompanied by elastic deformation of the piston rod associated with the large bending moment produced by these forces. Elastic deflections of the piston rod tend to limit the available length of the rod end-seals as will be shown herein.

Actuator Rod End Seal and Bearing Design

Figure 1:
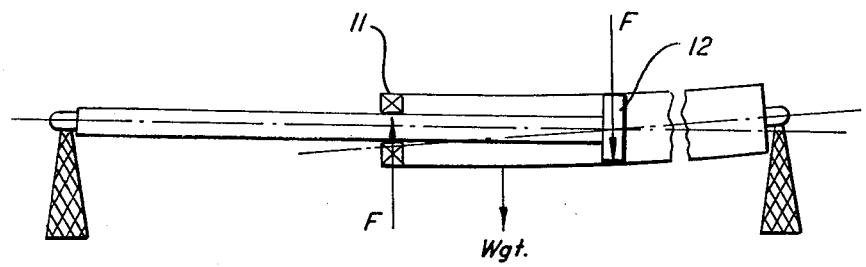
FIG. 1 shows the reactive forces at the rod seal and piston associated with the fully extended, horizontal, hydraulic actuator.

Many of the friction problems encountered in single rod end cylinders of long stroke, large bore design may be uniquely obviated by use of dual hydrostatic bearings. As shown in FIG. 1, friction forces F are developed between the piston rod and the cylinder body due to forces resulting both from the weight of the cylinder and from the normal seal forces due to a pressure drop across the seals. Both forces can be significant. For example, in FIG. 1, assume that the fully extended horizontal cylinder weighs 280 pounds and there is a 14½" spacing between rod bearing 11 and piston head 12. In this case the reaction force at the piston head would be about 430 pounds. The reaction force at the rod bearing would be about 440 pounds. Break-away friction force due only to the weight of the cylinder would thus be about 130 pounds. Experience has shown that even with the best hand-made cylinders, seal friction levels in a pressurized cylinder exceed 200 pounds and may easily approach 1000 pounds when made in production quantities.

In approaching the design of a conventional single-hydrostatic rod end bearing, information was obtained from manufacturers as to the diametral clearance that could be maintained between the piston rod and the bearing. It was determined that in practice this clearance could be held to within 0.001 to 0.003 inches. Assuming that the piston rod of FIG. 1 had a diameter of 2½ inches, it was calculated that when fully supported in the position shown in FIG. 1, the piston rod would experience an angular deflection due to the weight of the cylinder of approximately 0.001 radian (0.001 inches per inch).

Figure 2:
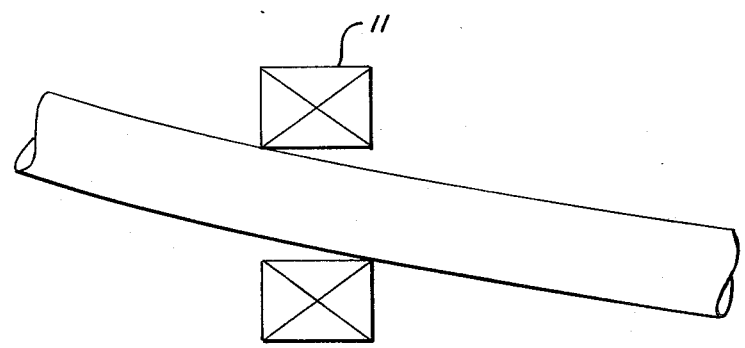
FIG. 2 is an illustration of the result of elastic deformation of the piston rod on the rod end-seal bearings.

With an angular deflection between the ends of the rod end bearing of 0.001 rad., the maximum length of the rod end bearing that could be used with a 0.001 inches diametral clearance was found to be less than one inch. A longer bearing would cause binding and very high friction forces. These binding and high friction points are indicated in FIG. 2 which shows the location of extreme contact between a deflected rod and the bearing. A hydrostatic bearing of one inch or less in length tends to be somewhat impracticable because of the high pocket pressures that would be required. Increasing the diametral clearance would allow the use of a longer bearing, but leakage flow rates of the hydraulic fluid would be high. (Minimum leakage is achieved by minimizing the diametral clearance and maximizing seal length). Even if the single end-seal hydrostatic bearing could be provided, high friction forces would still be present at the piston head where it bears on the cylinder wall.

The method conceived for eliminating the angular deflection problem was to use dual hydrostatic bearings to support the piston rod. See FIG. 3. With two bearings supporting the rod, a floating piston design was possible leading to drastic reduction in piston bearing friction forces at the cylinder wall. Analysis of the elastic deflection of the piston rod shows that the angular deflection of the rod at the seal where the rod exits from the cylinder is greater than the angular deflection experienced by the rod as it passes through the seal inboard of the cylinder. It may be shown that the maximum seal or bearing length that can be used without mechanical interference is equal to the angular misalignment (in radians) times the bearing clearance. For a given diametral clearance, either a conventional bearing or a hydrostatic bearing at the head end of the cylinder; that is, at the end from which the piston rod exits; will have the same maximum allowable bearing length. However, with dual hydrostatic bearings of the type herein disclosed, the second bearing provides additional sealing area. The length of this additional sealing area can be greater than the length of the sealing area of the first bearing at the cylinder head end because of the reduced angular deflection of the piston rod as it passes through this inboard bearing.

Hydrostatic bearings provide sealing by use of close mechanical tolerances in conjunction with the hydraulic fluid's viscosity. This type of sealing may be termed viscous or dynamic sealing. The leakage rate of the fluid may be shown to be proportional to the clearance cubed, and inversely proportional to the length of the seal. Leakage is also affected by the centering of the rod within the bearing, bearing lower by a factor of as much as 2.5 when the rod is centered in the bearing as compared to the case when the rod is fully eccentric to the bearing.

Figure 3B:
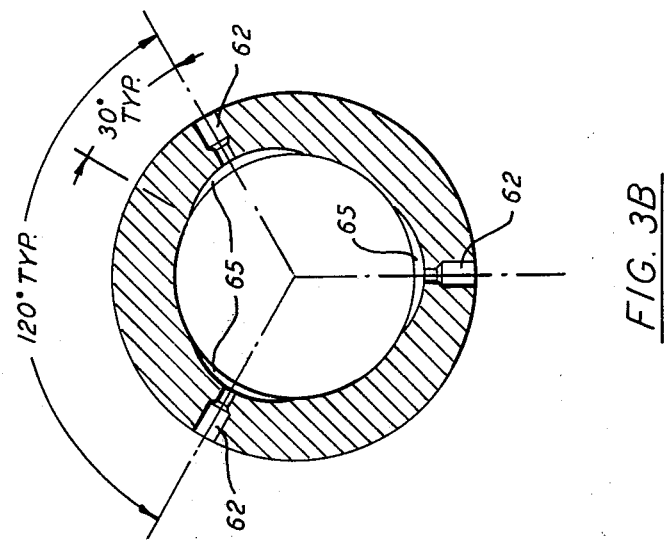
FIGS. 3A and 3B are sketches of the dual hydrostatic bearing.
Figure 3A:
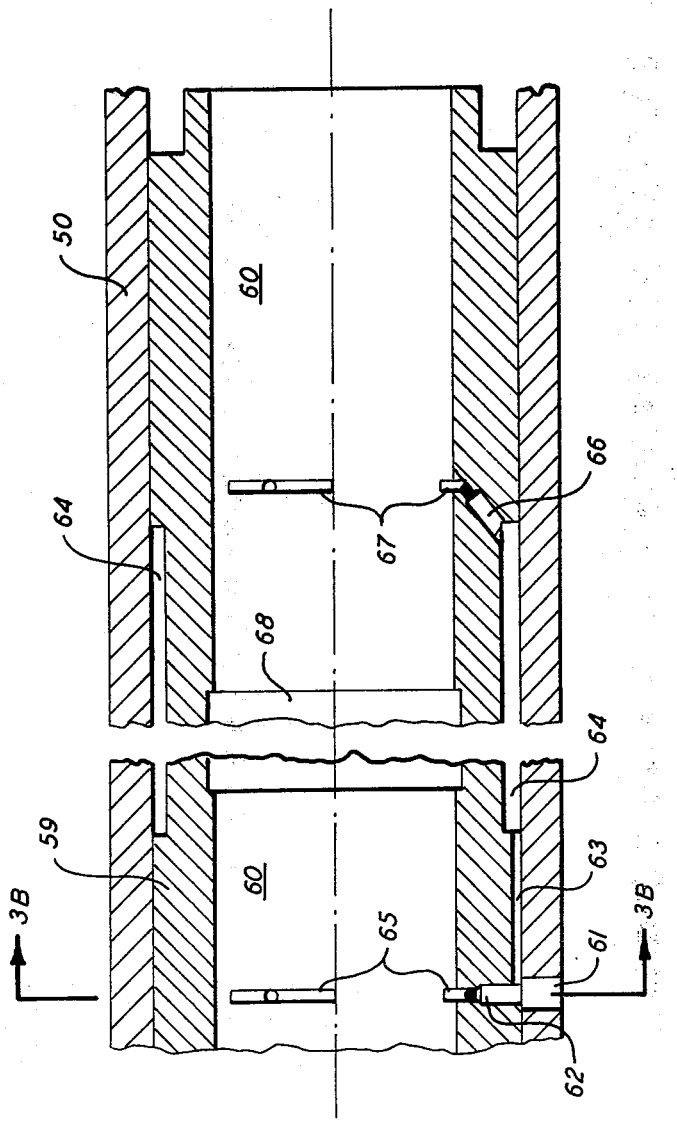

By using the dual hydrostatic bearing in the embodiment disclosed in FIGS. 3A and 3B instead of a conventional bearing, the maximum seal length was increased by a factor of 3 which thus decreased the leakage rate by the same factor due to the increase in the effective sealing length. Since either hydrostatic bearing also functions to center the shaft within the bearing, decreased leakage by another factor of up to 2.5 was experienced. Thus, total leakage decreased by a factor of approximately 7.5 as compared to a conventional single bearing. A design goal leakage rate of one gallon per minute with a source pressure of 1000 psi was easily achieved. Actual levels of leakage were measured at 0.4–0.6 gallons per minute.

Actuator Piston Seal Design

As already noted the use of the dual hydrostatic bearing led to a floating piston design. Indeed, large piston-to-cylinder clearances are desirable to insure that interference between the piston head and the cylinder wall does not develop as a result of manufacturing tolerance build-up. Using the dual bearing design and anticipated manufacturing tolerances it was calculated that the diametral clearance between piston head and cylinder wall should be at least 0.020 inches. The use of such a large diametral piston clearance made it impractical to use close clearance dynamic piston head seals.

The close fitting viscous seals could produce very low friction levels while controlling leakage of closely fitting moving parts have been shown in the prior art, (e.g., U.S. Pat. No. 3,168,013). The approach usually resulted in expensive actuators. Other approaches to sealing usually took the form of elastomers, plastic or cast iron having a usual width of about ¼ inch. Most of these seals were made in shapes such that a pressure difference across the seal increased the contact force between the seal and the moving actuator components to insure little or no leakage. However, this produced a resulting high contact force which was a major source of system friction. Therefore such seals are not desirable in servosystems can usually tolerate moderate amounts of leakage, and therefore high contact forces are not only undesirable but are really not necessary.

As is well known, with single rod end cylinders the face area of the piston head at the side connecting to the piston rod (the cylinder head end) is less than that of the opposite face which has none of its area obstructed. Force exerted by a cylinder is a function of pressure operating on an area (F = P/A). To achieve a balance of forces, as would be necessary to balance a given load, it is necessary that the pressure at the head end of the cylinder be greater than that on the unobstructed face of the piston (the cap end). It is course obvious that there be an unbalance of pressure on either side of the piston head to obtain movement of the hydraulic actuator. Thus, in either event, static or dynamic, there will be a pressure drop across any sealing element used between the piston and the cylinder wall in a single rod end cylinder.

One or many narrow sealing rings may be used to reduce contact force. If several identical rings are used as shown in FIG. 4, the pressure drop across each ring $P_R$ will be total pressure drop $P_1 - P_2$ divided by the number of rings N. This relationship may be further expressed in the folowing equation for net radial force $F_R$ $$F_R = \pi DW \frac{(P_1 - P_2)}{N} \quad (1)$$

where
$\pi$ d is the length of the seal along the hydraulic cylinder circumference.
W is the width of a sealing ring, and $(P_1 - P_2)$ is the total pressure drop across the sealing area.
If there are N rings, the total radial force is N times the force of a single ring or $$F_{R\ total} = DW(P_1 - P_2). \quad (2)$$

Mutliplying the total radial force times the coefficient of friction $\alpha$ yields the total friction force $F_{f\ total}$ produced by the sealing rings, that is, $$F_{f\ total} = \alpha \pi DW (P_1 - P_2) \quad (3)$$

As may be seen from the latter equation, if initial spring preload foces are neglected, and only pressure effects are considered, the total seal friction foce is independent of the number of sealing elements used. Since increasing the number of sealing rings does not reslt in excessively increasing the friction, it is seen that leakage may be minimized by using a number of sealing elements, since there will be a pressure drop produced across each of the sealing elements employed. The pressure distribution across multiple sealing rings is shown in FIG. 4.

Figure 4B:
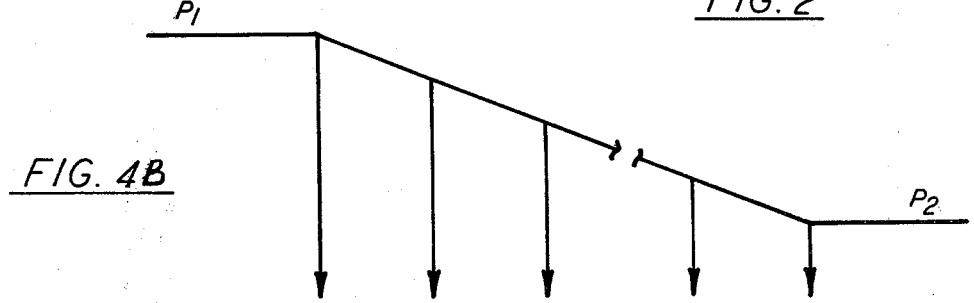
FIGS. 4A and 4B illustrate the use of multiple, narrow sealing rings and the pressure distribution across them.
Figure 4A:
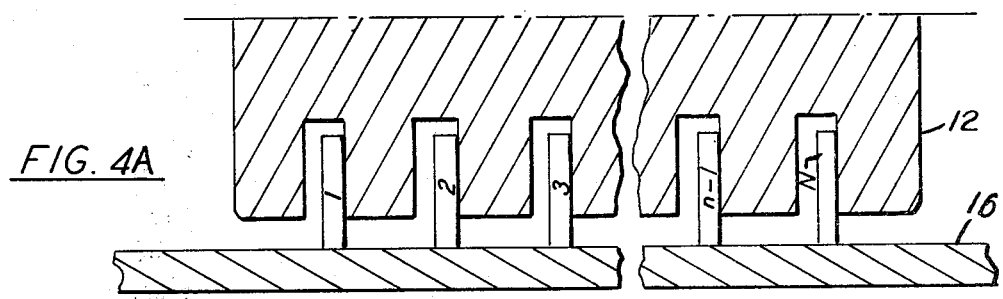

FIG. 4A indicates the use of multiple sealing rings on a hydraulic actuator piston to provide sealing between the piston head 12 and the cylinder wall 16 of the actuator. FIG. 4B illustrates the pressure distribution across the multiple sealing rings. The lengths of the arrows are indicative of the drop in average contact pressure applied to each ring. The average contact pressure $P_n$ at any $n^{th}$ ring is determined by the equation:

$$P_n = \frac{P_1 - n(P_1 - P_2)}{N} \quad (4)$$

Since the average contact force at any ring is equal to $P_n$ over the sealing area of the ring, the contact force falls off in the same manner as the contact pressure.

Although multiple sealing rings have been used in the past because of their greater durability and shock resistance, the rings chosen were usually wide, on the order of 0.250 inches, and little attention was paid to friction effects. Using multiple, narrow sealing rings to minimize leakage without increasing friction foces is thought to have first been conceived in the invention disclosed herein.

The use of narrow sealing rings was evaluated using commercially available, cast-iron, automotive piston rings having a width of 0.078 inches. With nominal head end and cap end pressures of near 500 psi, and a differential pressure of 120 psi, the static friction force of a single ring was measured at 11 pounds. Leakage was measured at 0.033 gpm, using 190 ssu oil (100° F.) operating at about 140° F.

Comparison with bronze filled, teflon rings and with close-clearance seals led to the conclusion that the best piston seal, in terms of performance and of procurement and manufacturing costs, was the narrow, cast-iron ring. Note may be made of the fact that steel sealing rings, 0.0235 inches wide, provided satisfactory results, but the cast iron ring is preferred to eliminate concern that the steel ring might cause scoring of the cylinder walls.

Actuator Cushion Design

Conventional practice in hydraulic cylinder cushion design has been, and still is, to block the flow of hydraulic fluid out of the cylinder at some point before the piston rod is fully extended, thereby providing a hydraulic cushioning effect. As already indicated, the cushion is normally formed by some form of a spear and cavity arrangement. The spear enters the cavity as the piston head is exercised near the end of its excursion, gradually blocking the oil and forming the cushion. Close mechanical tolerances are required to form an effective seal, especially at the rod side of the piston head.

This type of cushion was analyzed with the conclusion that, due to temperature and pressure effects, and normal machining tolerances, the spear and cavity cushion would not provide a reliable and safe cushioning actin in a hydraulic actuator used for simulator devices. This conclusion would be forced on any investigator involved in the design of rapidly exercised hydraulic actuators where the operation of the actuator involves the safety of human life and expensive equipment.

The cushioning technique most suitble for simulator applications and the like was one in which, as the piston reaches the end of its excursion, oil is forced out of the cylinder through small holes in the cylinder wall. With this design, the piston head progressively blocks off the holes as it travels toward the end of the cylinder. By proper sizing and positioning of the holes, accurate control of the cushioning action can be achieved. A cylinder with an array of cushioning holes has been sometimes referred to as, "a metering orifice cylinder", or more simply and more frequently it has been denoted, "a piccolo cushion cylinder". Piccolo cushioning techniques are conventionally applied to shock absorber and door check valve cylinders, railroad couplers and the like.

Reference may be had to the following U.S. Patents which disclose the use of hhole-aray cushioning techniques: U.S. Pat. Nos. 1,548,773; and 3,889,934. The piccolo hole cushion will be discussed further in conjunction with FIG. 5 in which the cushion hole array is illustrated.

Actuator Displacement Transducer Design

As noted earlier, means for measuring the dispicement of the piston from a given position have typically been placed external of the hydraulic actuator and were often mechanically involved, bulky, expensive, and subject to damage from other physical activity in the immediate area of their use. To overcome these difficulties the invention places the actuator displacement transducer completely within the actuator cylinder. To this end, the piston head and rod were gun-bored and a magnetostrictive, sonic delay line was installed within the bore. An annular shaped magnet, emplaced at the face of the piston head, encircles the delay line. When a circumferential magnetic field is impressed upon the magnetostrictive element, it reacts with the field of the magnet to impress a torsional striction pulse on the sonic waveguide. Piston displacement is measured in terms of time elapsed between the initiation of the circumferential magnetic field and the detection of the torsion pulse. Since the torsion pulse is established by the location of the annular magnet along the sonic delay line, the time will vary as the piston is exercised within the hydraulic cylinder varying the position at the magnet along the length of the line.

Figure 5:
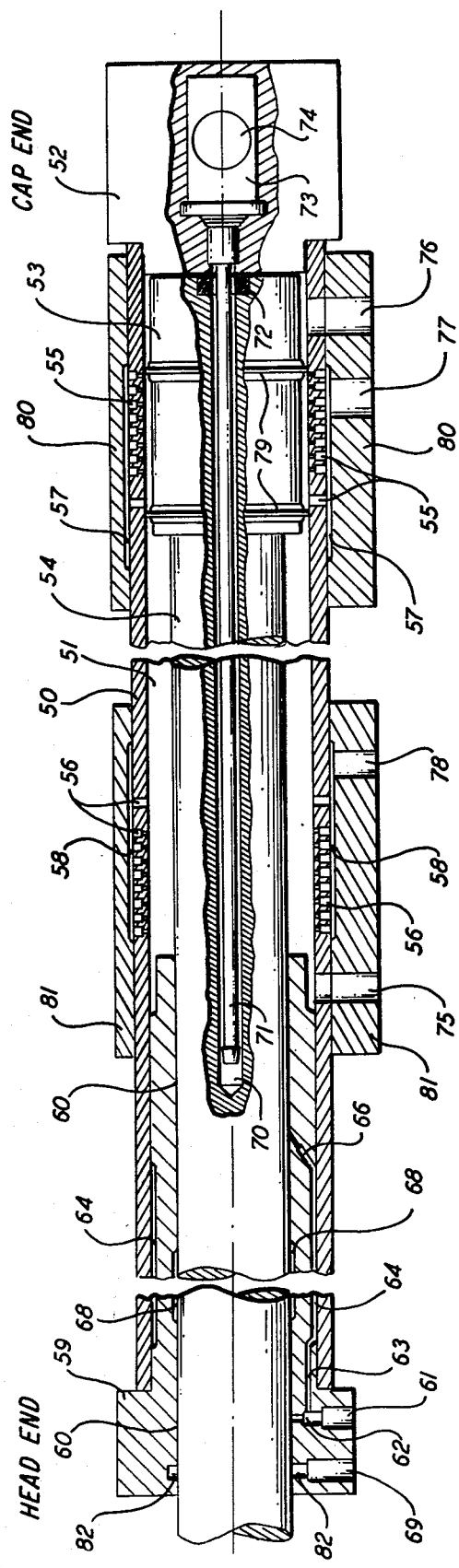
FIG. 5 is a sketch of the long stroke, large bore, low friction hydraulic actuator.

The sonic wave guide displacement transducer is illustrated in FIG. 5 and will be further discussed in light of that figure. For the theory of operation of such sonic delay lines reference may be had to U.S. Pat. Nos. 3,173,131 and 3,898,555 (which are incorporated by reference herein), among others.

Long Stroke, Large Bore, Low Friction Hydraulic Actuator Design

Reference should now be made to FIGS. 3 and 5 for a more detailed description of a preferred embodiment of the long stroke, large bore, low friction hydraulic actuator. FIG. 5 illustrates an embodiment of a hydraulic actuator as comprising a tubular member 50 defining a fluid chamber 51. The tubular member 50 is closed at one end (the cap end) by a closure member 52. Closure member 52 is secured to the end of tubular member 50 in a flid-tight manner using means well known to the art. A suitable mounting fixture, not shown, is formed at the end of closure member 52.

Within fluid chamber 51 is located a piston comprising piston head 53 and an operating piston rod 54. A suitable mounting fixture, not shown, is formed at the end of rod 54. Openings 55 provide a fluid flow path from fluid chamber 51 to a second fluid chamber 57 which is coaxial to fluid chamber 51. Fluid chamber 57 may be formed by an undercut in the inner wall of sleeve 80. Sleeve 80 is secured to tubular member 50 in a fluid-tight manner.

In similar manner, openings 56 provide a fluid flow path to a third fluid chamber 58, also coaxial to fluid chamber 51. Fluid chmber 58 may be formed by an undercut in the inner wal of sleeve 81. Sleeve 81 is secured to tubular member 50 in a fluid-tight manner.

A guide member 59 is inserted into tubular member 50. The end of tubular member 50 and the flange end of guide member 59 are joined in a fluid tight manner. Guide member 59 is provided with an axially extending opening 60 which axially, slidably receives piston rod member 54. A fluid port 61 is carried by guide member 59 and is connected to axial opening 60 by means of restricted orifice 62. Fluid port 61 is adapted to be connected to a source of high pressure fluid flow not shown. Restricted orifice 62 communicates the high pressure fluid to axial opening 60 where, in conjunction with undercut pockets 65 (FIG. 3), a hydrostatic bearing is formed. Becauseorifice 62 is restricted, fluid flow is limited but high pressure is maintained in the bearing areas.

Fluid port 61 communicates by way of fluid duct 63 with a fourth fluid chamber 64, which may also be coaxial with fluid chamber 51. A fluid flow path from fluid chamber 64 to axial opening 60 is provided by restricted orifice 66. With the cooperation of undercut pockets 67 (FIG. 3), a second hydrostatic bearing is formed as the high pressure fluid exits from restricted orifice 66.

Guide member 59 is provided with an undercut 68, thereby enlarging axial opening 60 in the region of the undercut. Undercut 68 permits the elastic deformation of piston rod 54 without contact being made to guide member 59. Undercut 68 also obviates the need for maintaining close manufacturing tolerances along the full length of axial opening 60. Undercut 68 is centrally located between hydrostatic bearing pockets 65 and 67.

There is essentially no fluid flow between bearing pockets 65 and 67 since the fluid pressure at one set of bearing pockets equally opposes the tendency of fluid to flow from the opposite set of pockets. Further, fluid flow from bearing pockets 67 toward the cap end of fluid chamber 51 is opposed by the fluid pressure within chamber 51. Such flow as there is, is relatively insignificant and is directed via gland duct 82 through fluid port 69 to a scavening means not shown. A low friction wiper seal may be utilized at the head end of the cylinder to the left of gland duct 82 illustrated in FIG. 5 to provide a wiping action on the surface of piston rod 54.

An elongated chamber 70 is provided in piston rod 54 and piston head 53. Chamber 70 is coaxial to both piston head 53 and piston rod 54. Chamber 70 axially slidably receives an elongated, magnetostrictive, sonic delay line 71. An annular magnet 72 slidebly encompasses sonic delay line 71 and is affixed to piston head 53 in such a manner that activation of the hydraulic actuator causes magnet 72 to move slideably along the length of snic delay line 71 as the piston 53 is exercised. Sonic delay line 71 is affixed at one end to transducer 73. Transducer 73 is mounted internal to closure member 52 and is thus not exposed to the environment surrounding the hydraulic actuator. Transducer 73 is provided with an electrical connector 74 to provide external electrical access to transducer 73.

Fluid chamber 51 is provided with fluid ports 75 and 76. Fluid ports 75 and 76 are adapted to be connected to a source of fluid flow through a conventional directional change means not shown. Fluid chamber 57 is provided with fluid port 77. Fluid chamber 58 is provided with fluid port 78. Fluid ports 77 and 78 are adapted to be connected through a conventional directional change means to return fluid to the source of fluid flow which is not shown herein.

Assuming that tubular member 50 is maintained in a fixed position, upon fluid being directed through port 76 into the cap-end of fluid chamber 51, and fluid being exhausted from the head-end of chamber 51 through openings 56 into fluid chamber 58 and then through fluid port 78, piston head 53 will move axially to the left as the hydraulic actuator is shown in FIG. 5. This movement of piston head 53 will produce a corresponding axial movement of the rod member 54 since these members are all secured together. By connecting the end of piston rod 54 to means to be actuated, desired mechanical work can be produced.

Upon fluid being directed through fluid port 75 into the head-end of fluid chamber 51, piston head 53 and piston rod 54 will be moved to the right toward the position illustrated in FIG. 5. In the course of this latter motion, fluid will be exhausted from the cap end of fluid chamber 51 through openings 55 into chamber 57 and fluid port 77.

Although piston head 53 does not make slideable contact with the walls of fluid chamber 51, pressure difference between the head end and the cap end of fluid chamber 51 is maintained by the provision of narrow piston rings 79 located circumferentially about piston head 53.

Further, the provision that fluid be exhausted through openings 56 or 55 provides a safe, controlled, cushioned stop at either end of the piston travel. For example, as piston 53 travels to the left as illustrated in FIG. 5, fluid is exhausted through plurality of openings 56. As piston head 53 advances, ring 79 passes the largest of the openings 56. This action restricts the flow of the fluid being exhausted to that which is possible through the remaining smaller openings 56 and the piston is slowed. As the piston continues its advance, ring 79 continues past each successive hole, further restricting the flow of fluid, further slowing the travel of the piston until finally all flow is blocked when the last hole is passed. The remaining fluid acts as a cushion to safely and controllably stop the piston travel. The same result is achieved as piston 53 advances to the right of the illustration in FIG. 5 and the fluid is exhausted through plurality of openings 55.

Operation of the dual hydrostatic bearing end-seal is best understood with reference to FIGS. 3A, 3B and FIG. 5. Hydraulic fluid from a pressure source not shown is supplied to fluid port 61. The hydraulic fluid is then directed into axial opening 60 through restricted orifices 62 and via fluid duct 63, fluid chamber 64, and restricted orifices 66. As disclosed, the restricted orifices are used to control the flow of oil into the hydrostatic bearing pockets 65 and 67. To minimize the complexity and machining problems inherent in the production of restricted orifices, commercially available Lee Jets (registered trademark of the Lee Company) or the equivalent may be used.

Several factors affect the spacing of the hydrostatic bearings and the length of the bearing and sealing areas. These include a determination of the length of guide member 59. (Guide member 59 is often referred to as a "stop tube.") Its length determines that portion of piston rod 54 which will remain within tubular member 50 when piston rod 54 is fully extended. The length of stop tube 59 determines the degree of eccentricity the fully extended piston rod will experience within fluid chamber 51 when subjected to a lateral load.

A second consideration is the degree of elastic deformation of piston rod 54 when it is extended and again subjected to lateral loads. The length and separation of the hydrostatic bearings may be established to maintain minimal non-contacting clearance between the elastically deformed piston rod and guidemember 59 at any point along axial opening 60. The hydrostatic bearing lengths and separations are also chosen such that piston head 53 may be non contacting on the walls of fluid chamber 51 and that no increase in frictional force is exerted by piston 53 via ring 79 against the walls of fluid chamber 51 when a lateral load is applied, such as may be experienced on a fully extended hydraulic actuator supported at its extreme ends. (That is, the weight of the cylinder body itself should not increase the contact force between ring 79 and the walls of fluid chamber 51.) The length of the bearing seals is also determined by the hydraulic fluid leakage rate which may be tolerated. Such viscous sealing has been discussed earlier.

Minimum clearances between the piston rod 54 and guide member 59 are determined not only by elastic deflections but also by manufacturing tolerances. The embodiment of the hydraulic actuator described herein, as an example of the invention, may be taken as a 56 inch stroke, 3.5 inch bore, 2.5 inch rod actuator. Calculations based on elastic deflection and constraints upon the length of stop tube 59 indicated that a dual hydrostatic bearing having a head end bearing length of 3 inches and an inboard bearing length of 6 inches could be utilized with diametral clearances as small as 0.0025 inches, if manufacturing angular alignment errors were kept small.

The maximum diametral clearance that can be used is determined by the leakage flow rate which may be tolerated from the head end of the actuator. The hydrostatic bearing fluid flow is restricted and may be treated as negligible relative to the leakage flows of the fluid in fluid chamber 51.

The fluid leakage flow rate is given by:

$$Q = \frac{P\pi D_r h^3 (1 + 1.5\epsilon)}{12 \mu l}$$

where
 Q = leakage flow rate, in. $^3$/sec
 P = rod end pressure, psi
 $D_r$ = rod diameter, in.

h = radial clearance (½ diametral clearance), in.

$$\mu = \text{oil viscosity}, \frac{lb_f - \text{sec}}{\text{in}^2}$$

l = total seal length, in.
ε = eccentricity ratio of the rod in the bearing, dimensionless.

Assuming worst case conditions of ε = 1.0 (the rod is fully deflected to one side of the bearing) and
P = 500 psi
$D_r$ = 2.5 in.
h = 0.003 in.

$$\mu = 1.0(10)^{-6} \frac{lb_f - \text{sec}}{\text{in}^2}$$

l = 9.0 in.

Equation 5 gives a calculated leakage flow rate of 2.45 in.³/sec (0.64 gpm).

In operation, the fluid flowing through restricted orifices 62 and 66 experiences a pressure drop relative to the pressure provided by the source of hydraulic fluid. The fluid at the reduced pressure spreads out through undercut pockets 65 and 67 and results in the application of forces acting radially inward against the surface of piston rod 54. As may be inferred from FIG. 3B, these radially acting forces will be separated by 120°, thereby causing piston rod 54 to be centered within axial opening 60. It was calculated that a pressure of about 120 psi in each of undercut pockets 65 and 67 would fully support a lateral cylinder body load of 440 pounds when the piston was fully extended and horizontal and that this pressure would generate a hydrostatic bearing flow rate out of each undercut pocket 65 and 67 of about 0.243 in.³ per second with a clearance between the surface of rod 54 and undercut pocket 65 and 67 of 0.006 inches diametral clearance. Using the above information it was calculated that the maximum required hydrostatic bearing flow for the system would be about 0.4 gpm, and the maximum rod end leakage flow would be less than 0.64 gpm. The combined leakage flow from the head end of each cylinder was expected to be less than 1.0 gpm.

A prototype cylinder was constructed according to the teachings herein which consistently operated with total turn-around friction levels of 75 pounds or less. Using low viscosity hydraulic fluid (80 to 90 ssu), the combined leakage flow from the head end of the cylinder was measured to be on the order of 0.4 to 0.6 gallons gpm, significantly less than the expected 1.0 gpm.

A long stroke, large bore, low friction hydraulic actuator has been described. Among the unique teachings herein are that very narrow seals are effective in reducing friction, a large number of such narrow seals theoretically producing much less friction than a single seal of equivalent length; that where piston rod elastic deflections are so significant that they are a major factor in determining rod end leakage, the use of a dual hydrostatic bearing configuration can reduce rod end leakage by a factor of at least 3:1; and that with dual hydrostatic bearings the piston head and cylinder wall do not have to carry forces produced by rod bending moments necessary to support the weight of the cylinders, the necessary reaction moments being produced by the dual hydrostatic bearings.

Prior attempts at achieving low friction bearing surfaces at the piston head have involved hydrostatic bearings of conventional design. Such hydrostatic bearings at the piston head required long drilled fluid passage holes through the piston rod and the necessity of supplying pressurized oil to the moving piston rod. The use of dual hydrostatic bearings not only results in essentially eliminating contact friction at the piston head, but eliminates these latter problems as well.

The teachings herein are also unconventional in the application of the piccolo hole cushion approach to long stroke, large bore cylinder design. That such techniques could be applied to achieve safe, reliable cushions, undegraded by repeated piston operation, does not appear to have been obvious to those skilled in the art; rather the use of high cost, close tolerance spear and cavity cushions persists. That such spear and cavity cushions are costly and tedious to produce, requiring much hand work, may be seen when one considers a spear and cavity arrangement at the head end of the piston rod. Here the spear is on the outside of the piston rod and therefore its diameter is slightly larger than that of the rod's. Variations in clearances between the diameters of the spear and of the cushion on the order of 0.0001 of an inch have been found to have drastic effects on the ability of the spear-and-cavity cushion to perform its function properly. In addition, once the spear and cavity cushion has been fine tuned by hand work to perform satisfactorily, the constant wear and scoring of the walls of the spear and the cavity as the cylinder is actuated results in a regular and continued degradation of the cushioning effect. The piccolo hole array cushion suffers none of these detrimental characteristics.

A novel arrangement for utilizing a sonic magnetostrictive delay line and sonic transducer, totally internal to the hydraulic actuator, has also been disclosed so as to provide for constant monitoring of piston displacement.

Further, the use of commercially available, narrow, automotive piston rings is a cost effective innovation, since these piston rings not only utilize the disclosed sealing advantages of narrow seals but are also selfconforming to the walls of the fluid chamber so as to eliminate the need for machining operations there. Thus, cylinders produced to normal manufacturing tolerances may be readily utilized.

It will be obvious to those skilled in the art that various changes and modifications may be made to the hydraulic actuator disclosed herein without departing from the invention. It is therefore intended to cover herein all such changes and modifications as fall within the true spirit and scope of the invention.

What is claimed is:

1. A method for producing a large bore, long stroke, low friction, hydraulic actuator comprising the steps of:
   a. providing a tubular member with means closing one end of said member to define a fluid chamber;
   b. providing a piston comprising a piston rod and piston head slidably emplaced with said fluid chamber for reciprocal movement along a longitudinal axis of said tubular member;
   c. closing the opposite end of said tubular member with a guide member through which said piston rod passes;
   d. producing two axially spaced hydrostatic bearings about said piston rod, said bearings being located within said guide member near said opposite end of said tubular member and serving to hydrostatically support said piston rod and to provide a viscous seal about said piston rod as it passes through said guide member, producing said two hydrostatic bearings by providing a first and second plurality of circumferentially extending, circumferentially spaced undercuts along the interior surface of the guide member, and a like number of restricted orifices extending into the wall of the guide member for connecting said undercuts to a source of high fluid pressure, said first plurality of undercuts being axially spaced from said second plurality;

e. dimensioning and spacing said bearings such that, under any anticipated lateral loading, the piston rod does not make contact with the walls of said guide member, said piston head does not bear a significant friction load due to contact with the walls of said fluid member, and hydraulic fluid leakage along the piston rod is controlled;

f. providing an additional circumferential undercut along the interior surface of the guide member, between said first and second pluralities of bearing-producing undercuts, to help accommodate any elastic deformation of the piston rod;

g. providing said piston head with low friction sealing means located between the walls of said fluid chamber and said piston head; and h. providing means for connecting said fluid chamber to a source of fluid pressure so as to move said piston relative to said tubular member.

2. A large bore, long stroke, low friction, hydraulic actuator, comprising:

a. a tubular member with means closing one end of said member to define a fluid chamber;

b. a piston comprising a piston rod and piston head slidably emplaced within said fluid chamber for reciprocal movement along a longitudinal axis of said tubular member;

c. a guide member adapted to close the opposite end of said tubular member and to let said piston rod pass therethrough;

d. means for creating two axially spaced hydrostatic bearings about said piston rod, said bearings being located within said guide member proximate said opposite end of the tubular member, said bearings being spaced to ensure that, under any anticipated lateral loading, the piston rod does not make contact with the walls of said guide member and the piston head does not bear a significant friction load due to contact with the walls of said fluid chamber, the means for creating said bearings comprising a first and a second plurality of circumferentially spaced, circumferentially extending undercuts along the interior surface of the guide member, and a like number of restricted orifices extending into the wall of the guide member for connecting said undercuts to a source of high fluid pressure, said first plurality of undercuts being axially spaced from said second plurality, and further comprising an additional circumferential undercut along the interior surface of the guide member, between said first and second pluralities of bearing-producing undercuts, to help accommodate any elastic deformation of the piston rod;

e. low friction sealing means located between the walls of said fluid chamber and said piston head; and f. means for connecting said fluid chamber to a source of fluid pressure so as to move said piston relative to said tubular member.

3. The actuator of claim 2 wherein the hydrostatic bearings are dimensioned to produce a viscous seal about said piston rod as it passes through said guide member to thereby control hydraulic fluid leakage.

4. The actuator of claim 3 wherein said low friction sealing means comprise one or more piston rings of width less than 0.1 inches, so as to reduce the total contact force said piston rings make with the walls of said fluid chamber.

5. The actuator of claim 4 wherein said piston rings are self-conforming to variations of said chamber walls.

6. The actuator of claim 5 wherein said self-conforming narrow piston rings comprise cast-iron split piston rings.

7. The large bore, low friction, hydraulic actuator of claim 6 also providing controlled deceleration of the piston at either end of the piston stroke, further comprising:

metering orifices through which fluid is withdrawn from said fluid chamber in advance of said movement of said piston head.

8. The large bore, long stroke, low friction, hydraulic actuator of claim 7 also providing monitoring of displacement of the piston from an established reference position, further comprising:

(a) a magnetostrictive sonic delay line mounted within an elongated chamber within said piston;

(b) a permanent magnet affixed to said piston in a slidble, non-contacting relationship to said sonic delay line; and (c) means to detect a magnetostrictive stress produced in said sonic delay line by the interaction of an induced magnetic field in said line and said permanent magnet, the delay time between the induction of the magnetic field and detection of said magnetostrictive stress being a function of piston displacement.

9. In a hydraulic actuator wherein a piston is controllably moved by hydraulic fluid pressure axially along a bore of a hydraulic cylinder, said piston including a piston head located within said bore and a smaller diameter piston rod connected to said piston head and extending out of an end of the cylinder, and wherein low friction sealing means are located between the walls of said bore and said piston head, and said bore is connected to a source of fluid pressure so as to move said piston relative to said cylinder, the improvement comprising:

means for creating dual axially spaced hydrostatic bearings about the piston rod near said end of the cylinder, said bearings being axially dimensioned and spaced to restrain hydraulic fluid leakage along the piston rod and to substantially eliminate any reactive friction forces produced along the piston rod and about the piston head by lateral loading, the means for creating said hydrostatic bearings comprising a first and a second plurality of circumferentially spaced undercuts along the interior surface of the bore, and a like number of restricted orifices extending into the walls of the bore for connecting said undercuts to a source of high fluid pressure, each of said undercuts extending circumferentially, said first plurality of undercuts being axially spaced from said second plurality, and further comprising an additional circumferential undercut along the interior surface of the bore, between said first and second pluralities of bearing-producing undercuts, to help accommodate any elastic deformation of the piston rod.

10. In a hydraulic actuator which may be subject to lateral loading and has a piston head which moves axially in a fluid chamber of a hydraulic cylinder and a piston rod connected to said piston head and extending out of said cylinder through a stop tube, and wherein low friction sealing means are located between the walls of said fluid chamber and said piston head, and said fluid chamber is connected to a source of fluid pressure so as to move said piston head relative to said cylinder, the improvement comprising:

means for producing a pair of axially spaced hydrostatic bearings between said piston rod and stop tube, said bearings serving to minimize reactive friction forces produced between the piston rod and stop tube and between the piston head and chamber walls by lateral loading, and simultaneously preventing significant hydraulic fluid leakage along the piston rod, the means for producing said pair of hydrostatic bearings comprising a first and a second plurality of circumferentially spaced undercuts along the interior surface of the stop tube, and a like number of restricted orifices extending into the wall of the stop tube for connecting said undercuts to a source of high fluid pressure, each of said undercuts extending circumferentially, said first plurality of circumferentially spaced undercuts being axially spaced from said second plurality, and further comprising an additional circumferential undercut along the interior surface of the stop tube, between said first and second pluralities of bearing-producing undercuts, to help accommodate any elastic deformation of the piston rod.

11. The apparatus of claim 10 wherein the undercuts of each plurality are so spaced that each hydrostatic bearing also exerts a centering force on the piston rod.

12. The apparatus of claim 10 wherein the axial extent of the hydrostatic bearings are such that leakage along the piston rod is reduced by a factor of at least 3:1 compared to a conventional single bearing.

* * * * *

UNITED STATES PATENT AND TRADEMARK OFFICE
CERTIFICATE OF CORRECTION

PATENT NO. : 4,140,044
DATED : February 20, 1979
INVENTOR(S) : Joseph Biller et al It is certified that error appears in the above-identified patent and that said Letters Patent are hereby corrected as shown below:

Col. 5, line 30, "servosystems" should be --servosystems. Servosystems--.

Col. 5, line 42 before "course" insert --of--.

Col. 5, line 47 after "piston" insert --head--.

Col. 6, line 7 "foces" should be --forces--.

Col. 6, line 8, "foce" should be --force--.

Col. 6, line 11, "reslt" should be --result--.

Col. 7, line 28 "hhole-array" should be --hole-array--.

Col. 7, line 35 "displc" should be --displace--.

Col. 8, line 7, "flid-tight" should be --fluid-tight--.

Col. 8, line 21, "chmber" should be --chamber--.

Col. 8, line 22, "wal" should be --wall--.

Col. 8, line 36 "becauseorifice" should be --Because orifice--.

Col. 9, line 7, "snic" should be --sonic--.

Signed and Sealed this

Twelfth Day of June 1979

[SEAL]

Attest:

RUTH C. MASON
*Attesting Officer*

DONALD W. BANNER
*Commissioner of Patents and Trademarks*